United States Patent
Shelest et al.

(10) Patent No.: US 7,305,705 B2
(45) Date of Patent: Dec. 4, 2007

(54) REDUCING NETWORK CONFIGURATION COMPLEXITY WITH TRANSPARENT VIRTUAL PRIVATE NETWORKS

(75) Inventors: Art Shelest, Sammamish, WA (US); Christian Huitema, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 808 days.

(21) Appl. No.: 10/611,832

(22) Filed: Jun. 30, 2003

(65) Prior Publication Data

US 2004/0268121 A1   Dec. 30, 2004

(51) Int. Cl.
  *G06F 15/16*   (2006.01)
(52) U.S. Cl. .................. 726/15; 713/156; 726/11
(58) Field of Classification Search ............. 713/156; 726/15, 11

See application file for complete search history.

(56) References Cited

U.S. PATENT DOCUMENTS

| | | | |
|---|---|---|---|
| 5,483,597 A | 1/1996 | Stern | 380/30 |
| 5,511,122 A * | 4/1996 | Atkinson | 713/153 |
| 5,835,726 A * | 11/1998 | Shwed et al. | 709/229 |
| 5,983,350 A * | 11/1999 | Minear et al. | 726/11 |
| 6,009,475 A * | 12/1999 | Shrader | 709/249 |
| 6,141,755 A * | 10/2000 | Dowd et al. | 726/11 |
| 6,230,271 B1 * | 5/2001 | Wadlow et al. | 726/1 |
| 6,317,838 B1 * | 11/2001 | Baize | 726/11 |
| 6,327,659 B2 * | 12/2001 | Boroditsky et al. | 713/182 |
| 6,332,192 B1 * | 12/2001 | Boroditsky et al. | 713/168 |
| 6,473,863 B1 | 10/2002 | Genty et al. | 713/201 |
| 6,496,935 B1 * | 12/2002 | Fink et al. | 726/13 |
| 6,615,358 B1 * | 9/2003 | Dowd et al. | 726/14 |
| 6,631,435 B1 * | 10/2003 | Lym et al. | 710/305 |
| 6,834,795 B1 * | 12/2004 | Rasmussen et al. | 235/380 |
| 6,883,095 B2 * | 4/2005 | Sandhu et al. | 713/168 |
| 6,931,529 B2 * | 8/2005 | Kunzinger | 713/153 |

(Continued)

FOREIGN PATENT DOCUMENTS

WO   WO 97/00471   1/1997

OTHER PUBLICATIONS

Check Point, Check Point FireWall-1 Architecture and Administration, version 4.0, Sep. 1998, <http://www.checkpoint.com/support/technical/documents/FWArchitecture.pdf>.*

(Continued)

*Primary Examiner*—Nasser Moazzami
*Assistant Examiner*—David Garcia Cervetti
(74) *Attorney, Agent, or Firm*—Workman Nydegger

(57) ABSTRACT

A firewall acts as a transparent gateway to a server within a private network by initiating an unsolicited challenge to a client to provide authentication credentials. After receiving the client's credentials, the firewall verifies the authentication credentials and establishes a secure channel for accessing the server. Data destined for the server from the client may be forwarded through the firewall using the secure channel. The firewall may sign, or otherwise indicate that data forwarded to the server is from a client that the firewall has authenticated. The firewall also may provide some level of authentication to the client. While connected to the server, the client may access other servers external to the private network without having the data associated with the other servers pass through the private network. The firewall reduces configuration information that a client otherwise must maintain to access various private network servers.

36 Claims, 5 Drawing Sheets

U.S. PATENT DOCUMENTS

| | | | |
|---|---|---|---|
| 6,938,157 B2* | 8/2005 | Kaplan | 713/176 |
| 6,954,862 B2* | 10/2005 | Serpa | 726/5 |
| 7,010,604 B1* | 3/2006 | Munger et al. | 709/227 |
| 7,020,645 B2* | 3/2006 | Bisbee et al. | 707/1 |
| 7,051,365 B1* | 5/2006 | Bellovin | 726/11 |
| 7,058,817 B1* | 6/2006 | Ellmore | 713/183 |
| 7,073,067 B2* | 7/2006 | Mizrah | 713/183 |
| 7,143,174 B2* | 11/2006 | Miller et al. | 709/228 |
| 7,155,614 B2* | 12/2006 | Ellmore | 713/183 |
| 7,188,314 B2* | 3/2007 | Mizrah | 715/741 |
| 2002/0023220 A1* | 2/2002 | Kaplan | 713/176 |
| 2002/0099826 A1 | 7/2002 | Summers et al. | 709/227 |
| 2002/0161884 A1* | 10/2002 | Munger et al. | 709/224 |
| 2002/0199007 A1* | 12/2002 | Clayton et al. | 709/230 |
| 2003/0046391 A1* | 3/2003 | Moreh et al. | 709/225 |
| 2003/0046586 A1* | 3/2003 | Bheemarasetti et al. | 713/201 |
| 2003/0046587 A1* | 3/2003 | Bheemarasetti et al. | 713/201 |
| 2003/0177390 A1* | 9/2003 | Radhakrishnan | 713/201 |
| 2003/0200321 A1* | 10/2003 | Chen et al. | 709/229 |
| 2004/0003116 A1* | 1/2004 | Munger et al. | 709/245 |
| 2004/0083394 A1* | 4/2004 | Brebner et al. | 713/202 |

OTHER PUBLICATIONS

Check Point, Virtual Private Networking with FireWall-1, version 4.0, Sep. 1998, <http://www.checkpoint.com/support/technical/documents/FWVPN.pdf>.*

Ferchichi, Azim; "IPSEC VPN: Theory and Practice"; *ComTec*; 2000; vol. 78, No. 7-8; p. 9-14.

Huan Liang; Kabranov, Ognian; Makrakis, Dimitrios; and Orozco-Barbosa, Luis; "Minimal Cost Design of Virtual Private Networks"; IEEE CCECE2002 Canadian Conference on Electrical and Computer Engineering Conference Proceedings; May 12-15, 2002; Cat. No. 02CH37373; vol. 3; p. 1610-15.

Napier, Duncan; "Setting Up a VPN Gateway"; *Linux Journal*; Jan. 2001; No. 93; p. 60-62, 64-6.

"IP Security Remote Access (IPSRA)"; <http://www.ietf.org/html.charters/OLD/ipsra-charter.html>; visitied Jun. 30, 2003.

Patel, Baiju; Aboba, Bernard; Kelly, Scott; and Gupta, Vipul; "DHCPV4 Configuration of IPSEC Tunnel Mode"; <http://www.ietf.org/proceedings/01aug/I-D/draft-ietf-ipsec-dhcp-13.txt>; visited Jun. 30, 2003.

Kelly, Scott and Ramamoorthi, Sankar; "Requirements for IPSEC Remote Access Scenarios"; <http://www.ietf.org/proceedings/02jul/I-D/draft-ietf-ipsra-reqmts-05.txt>; visited Jun. 30, 2003.

Sheffer, Y.; Krawczyk, H.; and Aboba, Bernard; "PIC, A Pre-Ike Credential Provisioning Protocol"; <http://ietf.org/internet-drafts/draft-ietf-ipsra-pic-06.txt>; visited Jun 30, 2003.

Peter S. Ford, "Host Based IPSec", Sep. 15, 1999, Microsoft Corporation, peterf@microsoft.com.

Bernard Aboba, "VPN University Module 9: Extranets", Dec. 1999, Microsoft Corporation.

Bernard Aboba, "Innovations in VPN Packet Network Security", Dec. 1999, Microsoft Corporation.

* cited by examiner

REDUCING NETWORK CONFIGURATION COMPLEXITY WITH TRANSPARENT VIRTUAL PRIVATE NETWORKS

BACKGROUND OF THE INVENTION

1. The Field of the Invention

The present invention generally relates to virtual private networks (VPN), and in particular to an efficient way of accessing a VPN.

2. Background and Relevant Art

VPNs are an attractive cost-efficient alternative to wide area networks (WANs). A VPN basically allows a remote site or client to connect to a private network via a public network (usually the Internet). Once connected, the remote site or client appears as a local part of a private network—hence the designation virtual private network. A well-designed VPN can greatly benefit a company. For example, it can extend geographic connectivity, improve security, reduce operational costs versus traditional WAN, reduce transit time and transportation costs for remote clients, improve productivity, simplify network topology, and provide global networking opportunities.

There are two common types of VPN systems: remote-access and site-to-site. Remote-access, also called a virtual private dial-up network (VPDN), is a client-to-LAN (Local Area Network) connection used by a company that has employees who need to connect to the private network from various remote locations. Remote-access VPNs permit secure, encrypted connections between a company's private network and a remote client, often through a third-party service provider. Site-to-site VPNs make use of dedicated equipment and large-scale encryption to connect multiple sites over a public network such as the Internet. Site-to-site VPNs can be either intranet-based or extranet-based. Regardless of the type of VPN, a well-designed VPN incorporates security, reliability, scalability, network management and policy management.

VPNs use several methods for keeping connections and data secure. Typically this involves some type of encryption or firewall, or both. Encryption is the process of taking data that one computer is sending to another and encoding it into a form that only the other computer will be able to decode. Typical computer encryption systems belong to one of two categories: symmetric key encryption or public key encryption. In symmetric key encryption, each computer has a secret code it uses to encrypt a packet of information before it is sent over the network to another computer. The computer receiving the encrypted packet of information must also know the secret code in order to decode the message.

Public key encryption uses the combination of a private key and a public key. The private key is kept secret, whereas the public key generally is accessible to anyone who asks for it. The private key and public key are related in that the one decrypts data that is encrypted by the other. Accordingly, data that can be decrypted by the public key indicates that a holder of the corresponding private key encrypted the data, and therefore identifies the holder of the corresponding private key as the source of the encrypted data. Similarly, by encrypting data with the public key, the sender A common use of public key encryption involves Secure Sockets Layer (SSL). SSL is an Internet security protocol used by Internet browsers and web servers to transmit sensitive information. SSL uses a security handshake to initiate the secure session over a TCP/IP connection. During the handshake, information for determining symmetric encryption/decryption keys is exchanged using public key encryption. This handshake results in the client and server agreeing on the level of security they will use. After the handshake, SSL encrypts and decrypts the bytestream of the application protocol being used, e.g., http, nntp, telnet, etc. This means that all the information in both the http request and response is fully encrypted, including the URL, the client request, all submitted form contents (e.g., credit card numbers), any http access authorization information (e.g., client name and passwords) and all data sent from the server to the client. SSL and other protocols such as Transport Layer Security (TLS) operate at upper network protocol layers.

Another form of VPN security is known as Internet Protocol Security (IPSec). When combined with a key negotiation technology such as Internet Key Exchange (IKE), IPSec provides enhanced security features such as more comprehensive authentication ability to secure non-TCP traffic. Only systems that are IPSec compliant, therefore, can take advantage of this protocol. Unlike SSL and TLS, IPSec operates at lower network protocol layers.

Of course, VPNs are not suitable for all types of network access. For example, access to a public web site, transferring Internet email, and other types of access are expected to originate external to a private network and without authentication. For normal operation, therefore, certain types of external and unauthenticated access need to be supported. Allowing external access to a private network, however, introduces a variety of security risks.

A firewall provides a strong barrier between a private network and another network, such as the Internet, which are typically within different trust domains. To address the security risks introduced by external access, a firewall may restrict the number of open ports, what type of packets are passed through, and which protocols are allowed.

A firewall may be a combination of software and/or hardware that filters the information coming through the external network connection into a private network or computer system. If the filters flag an incoming packet of information, it is not allowed through. Typical firewalls use one or more of three techniques to control traffic flow into and out of a network, which include static packet filtering, proxy service, and/or dynamic packet filtering. Static packet filtering, as its name implies, analyzes chunks of data against a set of filters. Packets that make it through the filters are routed appropriately, whereas all others are discarded. If a proxy service is used, information from the network is retrieved by the firewall and then sent to the requesting system and vice versa. A newer technique that doesn't examine the contents of each packet, but instead compares certain key parts of the packet to a database of trusted information, is known as dynamic packet filtering. Information traveling from inside the firewall to the outside is monitored for specific defining characteristics. Incoming information is then compared to these characteristics. If the comparison yields a reasonable match, the information is allowed through. Otherwise, it is discarded.

While VPNs are an attractive alternative to WANs, there currently exist various shortcomings to using a VPN server for remote access. For example, if a client wishes to connect to both the web and the private network through a VPN, all network traffic must pass then through the VPN. This creates, however, efficiency, privacy compatibility problems. Efficiency problems are created because the connection must first go through the private network and then back out to the web. Accordingly, unnecessary traffic gets routed through the private network. Privacy issues are also created because such web surfing may be in violation of network policy. Even if, however, a connection existed to the Internet supporting such application with efficiency and privacy, this connection would not be used because all data is forwarded through a firewall of the network to which VPN is connected, thereby resulting in connectivity problems as well.

Current VPN use also often results in multiple gateways, each for disjointed networks. Multiple VPN gateways may undermine security and also may result in connectivity problems. For example, because a VPN client appears to be locally connected to the VPN, the client cannot participate in multiple VPN connections at once. Accordingly, if a client wishes to download information from one network to a separate network, the client must first establish a connection with the first VPN server, download the information to the client's storage, disconnect with the first VPN server, make a VPN connection with the second VPN network, and then download the information from the client's storage to the second network server. This creates a tremendous amount of inefficiency in both time and memory management.

Another disadvantage of current VPN systems is the complexity of tracking various VPN gateways within a private network. Clients are required to know certain configuration information for each VPN gateway, e.g., IP address, authentication information, etc. In addition, the client may not know, or it may not be intuitive, which VPN gateway must be used to access a particular server within the private network. As LAN configuration changes, clients may need to be promptly updated with new settings to facilitate continuing VPN access.

Accordingly, there exists a need for a transparent VPN, which will allow a client access to a network without necessarily requiring all information requested by or sent from the client to pass through the network. Further, there exists a need to be able to access more than one network simultaneously and to simplify access to a private network without undermining security needs.

BRIEF SUMMARY OF THE INVENTION

In accordance with exemplary embodiments of the present invention, the above-identified deficiencies and drawbacks of current VPNs are overcome. For example, exemplary embodiments provide for a private network that includes a resource and a firewall. The firewall acts as a gateway by controlling client desired access to the private network resource. The present invention provides a computer program product and method for establishing a connection to the private network resource while balancing the authentication processing requirements between a client and the firewall to mutually guard against denial of service attacks.

The computer program product and method provide for receiving, by the firewall, a request from the client to access the private network resources. The request from the client is made to the private network resource without any knowledge of the firewall. The firewall may then request the client to provide client credentials to authenticate the client. Further, the firewall may send its credentials to authenticate itself to the client. The firewall may also receive the client credentials.

Generating the firewall credentials and client credentials consume processing resources of the firewall and client, which are similar in magnitude. The firewall may then verify the client credentials and establish a secure channel for accessing the private network resource in response to the verification. Accordingly, the data from the client may then be forwarded to the private network resource through the firewall using the secure channel.

In accordance with another example embodiment of the present invention, a computer program product and method of establishing a connection to a private network resource is provided for by initiating a series of authentication transactions designed to impose commensurable processing burdens on a client requesting access to the private network resource and the firewall operating as a gateway for the private network. The client initially is unaware that the firewall operates as a gateway for the private network. Further, each authentication transaction incrementally increases a level of trust between the client and the firewall until the authentication of the client and the firewall are sufficiently verified.

The series of authentication transactions may include a way to authenticate the client in accordance with one of the series transactions, and challenging the client to authenticate in a manner requiring similar processing burdens. Upon completing the series of authentication transactions, the client is granted access to the private network resource through the firewall.

In accordance with yet another example embodiment of the present invention, a method of providing access to a server through a firewall without a client knowing about the firewall is provided for by the firewall receiving an access request from the client that is directed to the server. The access request is directed to the server because the client does not know that the firewall operates as a gateway for the server. The firewall generates one or more authentication credentials that demonstrate a level of trust between the server and the firewall, and sends a request for the client to authenticate to the firewall. The request includes the one or more firewall authentication credentials so that the client knows of the level of trust between the server and the firewall, without having to make a separate request. The firewall then receives and verifies one or more authentication credentials from the client. Thereafter the firewall allows the client access to the server through the firewall.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above recited and other advantages and features of the invention can be obtained, a more particular description of the invention briefly described above will be rendered by references to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to methods, systems, and computer program products for reducing network configuration complexity with transparent virtual private networks (VPNs). The embodiments of the present invention may comprise a special purpose or general-purpose computer including various computer hardware, as discussed in greater detail below with reference to FIG. 5.

Figure 1:
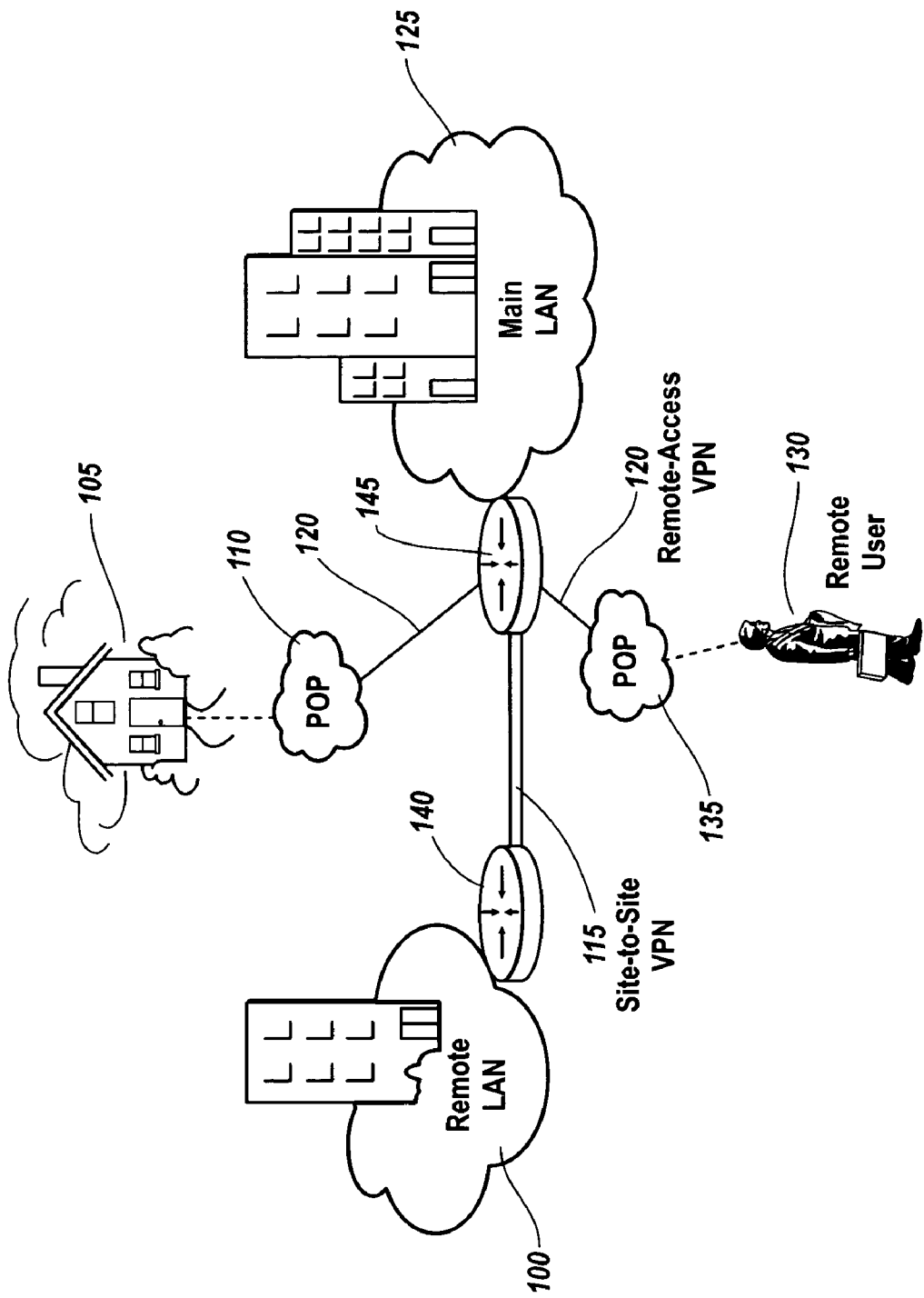
FIG. 1 illustrates typical VPN connections.

FIG. 1 depicts a typical VPN infrastructure, wherein remote users can connect to a private network using a public network such as the Internet. Main Local Area Network (LAN) 125 can be accessed by, for example, remote LAN 100 using a site-to-site VPN 115 and dedicated equipment for large-scale data encryption. Site-to-site VPN 115 can be intranet based, extranet based, etc. If a company has one or more remote locations that they wish to join in a single private network, they can create an intranet VPN to connect LAN to LAN. Also, when a company has a close relationship with another company, e.g., a partner, supplier or customer, they can build an extranet VPN that connects LAN to LAN and allows all of the various companies to work in a shared environment.

Alternatively, or in conjunction, a remote user 130 or home user 105 can connect to main LAN 125 through the use of remote-access VPNs 120. A corporation that wishes to set up a large remote-access VPNs 120 may outsource to an enterprise service provider (ESP), not shown, or setup their own VPN gateways. The ESP sets up a network access server (NAS) and provides the remote users 130 and 105 with client software for their computers. The remote users 130 and 105 can then dial a toll-free number to reach the NAS and use their VPN client software to access the corporate network via a point of presence (POP) 135 and 110 for a public or private network.

In FIG. 1, VPN traffic is sent over a public network such as the Internet through routers 140 and 145. Routers are specialized computers that send network traffic to their destinations along various pathways. A router has two separate, but related, jobs. First, it ensures that information does not go where it is not needed. Second, it makes sure that information reaches the intended destination. Accordingly, a router is extremely useful in dealing with two separate computer networks. It joins the two networks, passing information from one to the other. It also protects the networks from one another, preventing the traffic on one from unnecessarily spilling over to the other.

Figure 2:
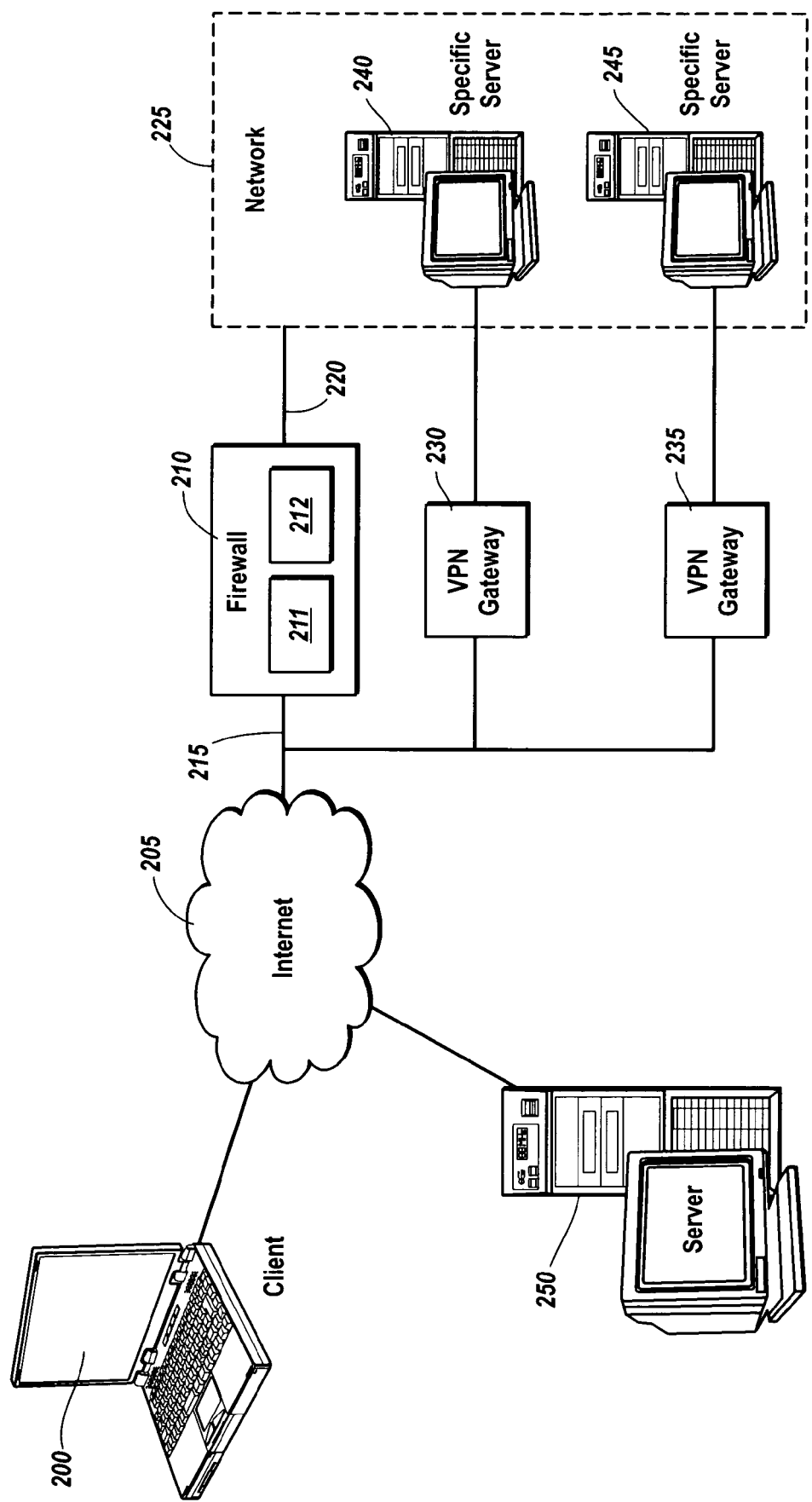
FIG. 2 illustrates a VPN connection in accordance with example embodiments of the present invention.

FIG. 2 shows a more detailed description of how a client 200 might access a network 225. Typically, the client 200 can access network 225 over the Internet 205. Data destined from the client 200 to the network 225 passes through firewall 210 or through one of the VPN gateways 230 or 235. Currently, if client 200 wishes to access network 225 through VPN gateway 230 or 235, the client 200 must know the IP address of the corresponding VPN gateway 230 or 235. (Frequently, EP addresses, rather than domain names, are used for VPN gateways as an additional security measure). For example, if specific server 240 is the mail server for private network 225, client 200 must know the IP address for gateway 230, which is the VPN gateway for the specific mail server 240. Similarly, if specific server 245 is the accounting server for network 225, client 200 must know the IP address for gateway 235, which is the VPN gateway for specific accounting server 245. Client 200 provides the VPN gateway with proper credentials in order to gain access to a specific server 240 or 245 in the private network 225. These credentials can be any one or combination of, e.g., a user's name, client's IP address, password, passport, smart card, credit card number, or the like.

In accordance with example embodiments of the present invention, client 200 may attempt access to the private network 225 via firewall 210. Unlike current designs, the client need not know the IP address of the firewall, because the packets destined for the private network 225 will appear at the outer (left) side of the firewall by the process of network routing of packets. Further, Firewall 210 has the ability to challenge client 200 for credentials. The types of challenges implemented by the firewall 210 may include the use of various encryption protocols, e.g., Secure Sockets Layer (SSL), Transport Layer Security (TLS), etc. As one of ordinary skill in the art would recognize, SSL and TLS are security protocols used to transmit sensitive information.

The problem with using typically types of security protocols (such as those mentioned above) in a transparent VPN, however, is the potential they have for allowing denial of service (DoS) attacks. As one of ordinary skill in the art would recognize, DoS attacks are incidents in which a user is deprived of the services of a resource they would normally expect to have because the resource is overwhelmed with invalid requests. For example, the loss of service may be the inability of a particular network service to be available, e.g., e-mail, or the temporary loss of all network connectivity and services.

Denial of service attacks may occur against either the client or network in a transparent VPN setting. For example, DoS attacks may occur at the firewall when it receives a message and sends a signed challenge back. Because the signed challenge requires much greater processing effort than sending a message, an attacker may easily overwhelm the firewall by sending a stream of packets to the firewall thereby denying service to legitimate clients. Similarly, DoS attacks may occur at the client when the client receives an unsigned challenge from the firewall instructing the client to provide proper security credentials. By shifting the processing burden to the client an avenue for attack is created. Anyone can send unsigned messages to the client, causing the client to contact a firewall and attempt a computational expensive authentication process.

In order to combat the potential problem of DoS attacks, the present invention provides for alternative types of authentication. One example embodiment uses zero-knowledge proof to challenge the client for credentials. Simply stated, zero-knowledge proof involves a sequence of exchanges between a client and a firewall that incrementally increases the level of trust between them as the communication progresses. The exchanges may be in several evolving sequences, which may include sending a message back to the requestor with the original message attached, a series of random questions like name or time, etc.

More formally, a zero-knowledge proof is an interactive proof protocol between two parties, including a prover and a verifier. The prover convinces the verifier of a statement without revealing any information about how to prove the statement. A zero-knowledge proof typically includes several rounds. A typical round in a zero-knowledge proof might consist of a "commitment" message from the prover, followed by a challenge from the verifier, and then a response to the challenge from the prover. While it may be possible for the prover to guess an appropriate response for a given round, the protocol may be repeated until an acceptable level of improbability for successively correct guesses is reached. In other words, if in each round of the proof there is a fifty-fifty chance of guessing the correct response, then, after twenty iterations, the probability of guessing each of the twenty responses correctly is less than $2^{-20}$, or 0.0000009536. Based on the prover's responses in all the rounds, the verifier decides whether to accept or reject the proof.

An implementation of a zero-knowledge proof may include the firewall 210 anonymously challenging the client 200. The client 200 can submit proof that it has credentials, and that the credentials are correct without actually giving the credentials to the firewall 210, using zero-knowledge proof techniques, as described above. Accordingly, as used in this application, the term "credentials" should be interpreted broadly to encompass zero-knowledge proofs based on credentials as well as the credentials themselves. Alternatively, or in conjunction, client 200 can request that firewall 210 identify itself before the actual credentials are submitted.

Another authentication process that can be modified and used to combat DoS attacks in accordance with example embodiments is known a unilateral authentication process. This process enables a device to write a message in such a way that the message could only have been written by this particular device. This authentication mechanism is unilateral in that the recipient does not need to have further communications with the sender for completing the authentication process. The message contains everything the message recipient, e.g., the client, needs to decode the message and to determine that it must have come from this particular device.

The invention is based on public key/private key cryptography used in combination with the selection of, e.g., a network address of the message sender based on the public key. The following illustration shows how unilateral authentication may be used in the present invention. Client 200 may request access to a particular host or server in network 225, e.g., specific servers 240 or 245. Initially, client 200 is unaware of firewall 210, and simply intends that the request be delivered to a specific host in network 225 (please note that the specific server protected by firewall 210 is not shown). Since firewall 210 may be protecting a specific host in network 225, however, the request is first delivered to the firewall.

Before forwarding the request to the desired host in network 225, firewall 210 needs to verify that client 200 is authorized to access the specific host in network 225. While firewall 210 is free to request that client 200 authenticate itself, client 200 is unaware of firewall 210 and may suspect that firewall 210 is attempting an attack, such as a DoS attack, or a security breach. Accordingly, client 200 may not respond to the authentication request of firewall 210, and therefore may not gain access to the desired host in network 200.

The present invention, however, allows firewall 210 to gain the trust of client 200 in a unilateral way. For example, exemplary embodiments provide that firewall 210 and the desired host within network 225 have a trust relationship. As such, firewall 210 is allowed access to the desired host's private-key or the desired host within network 225 will use its private-key on behalf of firewall 210. Accordingly, when firewall 210 requests client's 200 credentials, firewall 210 may include a message or network address encrypted with the private-key of the desired host within network 225 to indicate that firewall 210 is trusted by the desired host in network 225. If client 200 is able to decrypt the message with the public-key of the desired host in network 225, then client 200 knows that the message was encrypted with the private-key of the desired host or server, and therefore can infer that firewall 210 is trusted by the desired host in network 225.

Client 200 also can create and maintain a cache of authenticated public key/network address associations for various advantageous reasons when using the unilateral authentication process. For example, with a cache in place client 200 can use it to authenticate incoming messages, especially messages that arrive without public keys. For messages that contain public keys, however, it may seem at first that the cache does not reduce the recipient's processing load because for these messages the aforementioned procedures must still be performed. That is often true, but an exception makes the cache very valuable. As mentioned above, a recipient may be the target of a DoS attack in which it is flooded with invalid incoming messages. The cache can be used to prevent this. If the number of incoming messages exceeds the number that the recipient can comfortably process, then the recipient processes incoming messages according to a simplified procedure. For example, the message's public key and network address can be compared with public key/network address associations already in the cache. If no match is found then the message is discarded. If a match is found, then the message is subjected to the full authentication procedure described above. During the DOS attack, this procedure filters out invalid messages without wasting expensive decryption time on them and thus allows the recipient to keep up with valid incoming messages. Of course, this procedure only decrypts messages whose public key and network address are already in the cache. It does not allow the recipient to accept an incoming message with a valid, but not previously seen, public key and network address. That is a tradeoff a client may be willing to make during the course of the DOS attack. Once the recipient weathers the DOS attack successfully, it reverts to the fuller procedures.

After the client 200 offers credentials to the firewall 210, the firewall 210 verifies the credentials and negotiates a secure channel 215 with the client for accessing the servers 240 and 245 of the private network 225. From then on, the client 200 uses the secure channel 215 for packets destined for servers 240 and 245 (or other servers) of the private network 225. Other packets of data destined for other servers, e.g., server 250, will be routed through the Internet 205 to server 250 without first having to go through the private network 225.

In an alternative example embodiment of the present invention, the firewall 210 forwards packets of data to the servers 240 and 245 of the private network 225 using an authenticated channel 220, which indicates to the server that the client has passed security checks implemented in the firewall. The authenticated channel 220 may include, for example, signed data certified by the firewall 210 specifically indicating that client 200 is authorized to access private network 225.

In yet another alternative example embodiment of the present invention, the firewall may be nested or one of several firewalls 211 and 212 in the path to network 225.

Each firewall 211 and 212 acts as a checkpoint for governing security aspects of the private network 225.

As one of ordinary skill in the art would recognize, typically firewalls do not challenge the user to provide credentials to avoid denial service attacks, which cause a firewall to become overloaded and deny service to all users attempting to access a private network. In accordance with example embodiments of the present invention, this problem can be solved by firewall 210 challenging the client 200 by sending unsigned packets and making the client 200 perform cryptographic or other processing before allowing access to the private network 225. As one of ordinary skill in the art would recognize, this process is known as a puzzle defense. The firewall 210 shifts the processing (or another) burden to the client 200 by requesting that it solve a puzzle prior to granting access to the private network 225.

Figure 3:
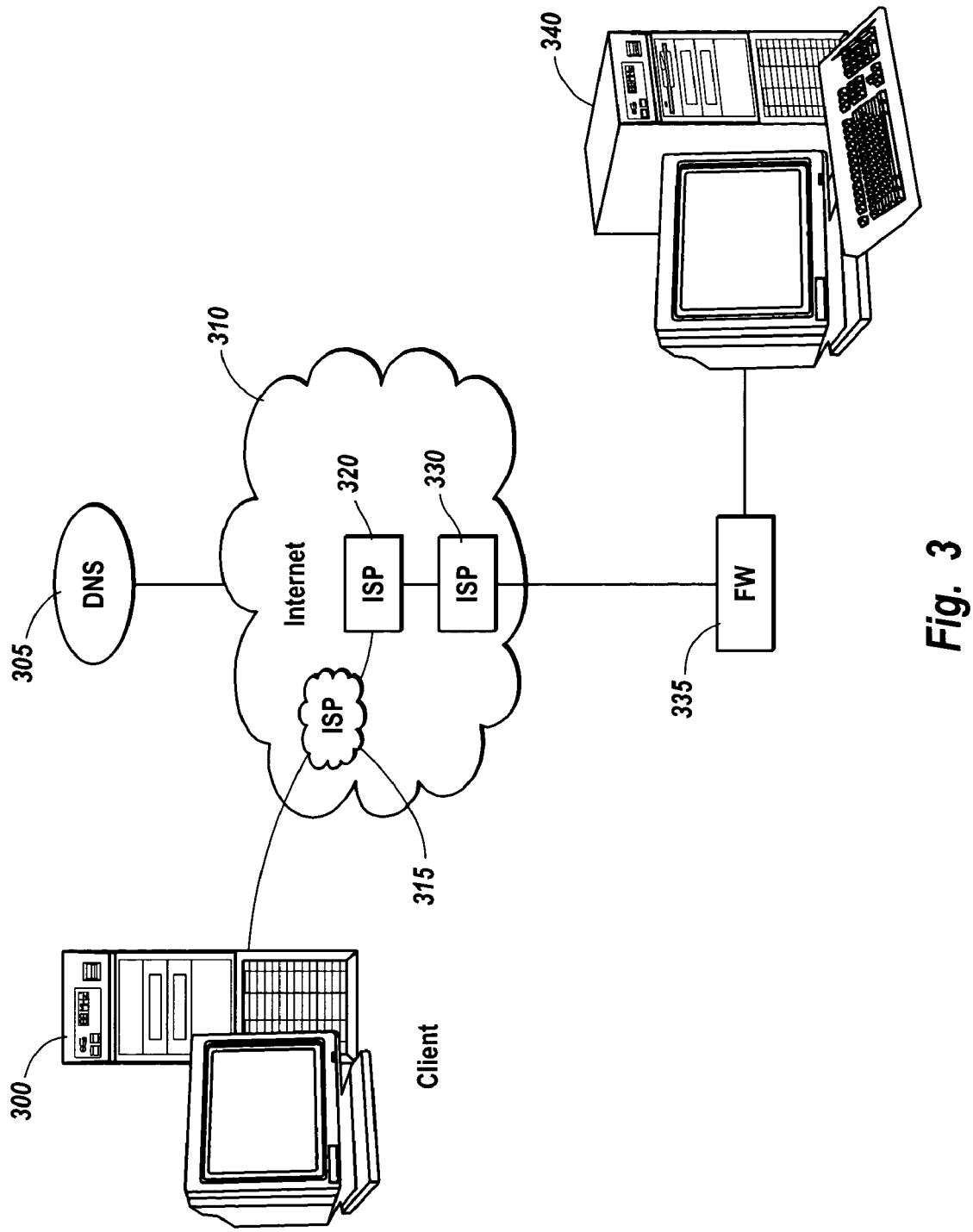
FIG. 3 illustrates the functionality of a transparent VPN connection in accordance with example embodiments of the present invention.

FIG. 3 shows an example embodiment of how the client 300 is routed to the server 340 and through the firewall 335. As one of ordinary skill in the art would recognize, a domain name, e.g., www.company.com, may be used to route client 300 to the firewall 335. Client 300 is connected to the Internet 310 through Internet Service Provider (ISP) 315, which has knowledge of at least one domain name system (DNS) server 305. When client 300 initiates its browser requesting a connection to http://www.company.com it may request information from DNS server 305 for the specific IP address of http://www.company.com. If the DNS server 305 has knowledge of the specific IP address of www.company.com, it can then provide this information to client 300. Client 300 then sends the data with information of the specific IP address to its ISP 315, which then forwards the data onto one or more other ISPs, such as ISPs 320 and 330, with routing databases for reaching server 340. On its way to the server 340, the data passes through the firewall 335. It should be noted that DNS information directs traffic for http://www.company.com to firewall 335. Accordingly, the client does not need specific knowledge of the firewall 335 or server 340, but only needs a domain name.

Firewall 335 will now challenge client 300 for credentials. This challenge may be in the form of the firewall not responding to the client's 300 request for access to the server 340. As such, the client 300 will know that it needs to send credentials in order to have access to the secured server 340.

The present invention may also be described in terms of method comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts and/or steps.

Figure 4:
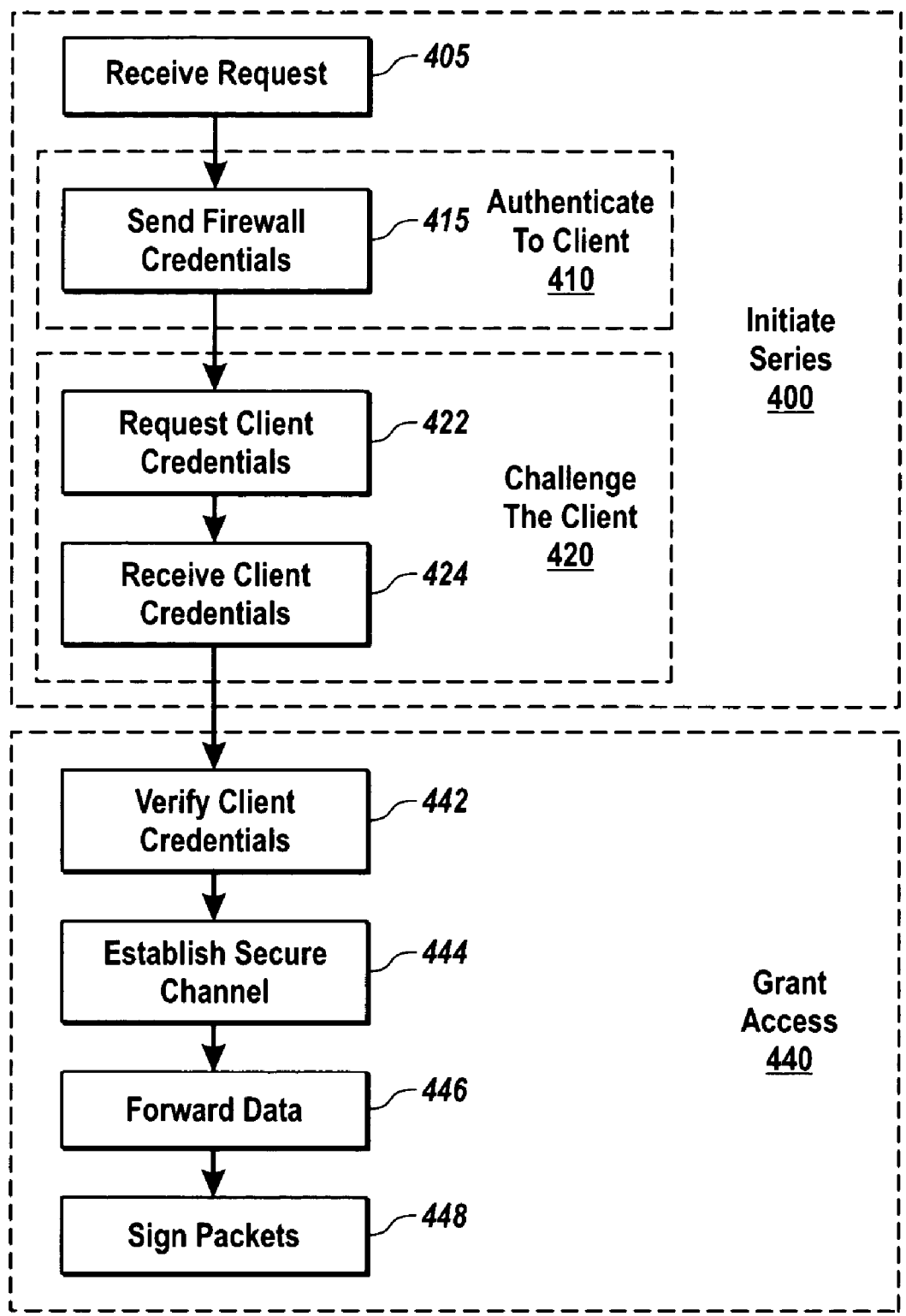
FIG. 4 shows example acts and steps for methods of connecting a client to a private network in accordance with the present invention.

FIG. 4 illustrates example steps and acts used in establishing a connection to a private network while balancing authentication requirements between a client and a firewall to mutually guard against denial of service attacks. A step for Initiating a Series 400 of authentication transactions may include an act of Receiving a Request 405 from the client to access the private network resource. The series of authentication transactions are designed to impose commensurable processing burdens on the client requesting access to the private network resource and the firewall operating as a gateway for the private network. Further, the client is initially unaware that the firewall operates as a gateway of the private network. Moreover, each authentication transaction incrementally increases a level of trust between the client and the firewall until the authentication of the client and the firewall are sufficiently verified.

The step for Initiating a Series 400 may also include a step for Authenticating to the Client 410 in accordance with one of the series of transactions. Further, the step for Authenticating to the Client 410 may include the act of Sending Firewall Credentials 415 by the firewall to authenticate the firewall. The generating of the firewall credentials consumes some level of limited firewall processing resources.

The step for Initiating 400 may also include a step for Challenging the Client 420 for credentials. The step for Challenging 420 may further include the acts of Requesting Client Credentials 422 and Receiving Client Credentials 424. The generation of the client credentials consumes some level of limited client processing resources similar in magnitude with the consumption of the limited firewall processing resources.

Finally, a step for Granting the client Access 440 to the private network resource through the firewall upon completing the series of authentication transactions may include the following acts. First, an act of Verifying Client Credentials 442. Next, an act of Establishing a Secure Channel 444 for accessing the private network resource of the private network in response to the verification of the client credentials. Then, an act of Forwarding Data 446 from the client destined to the private network resource through the firewall using the secured channel. Finally, an act of Signing Packets 448 by the firewall is provided. The signed packets of data are from the client destined to the private network resource, and the signing indicates that the client has passed a minimum level of security implemented in the firewall.

The act of Signing 448 allows the firewall to forward packets to the server using an authenticated channel, e.g., signed data, which indicates to the server that the client has passed security checks implemented in the firewall. In act 448, IPSec Authentication Header (AH) facility is one of the ways to establish an authenticated tunnel between the firewall and the server. In addition, the firewall may be a nested or one of several firewalls, wherein each firewall acts as a checkpoint that governs security aspects of the private network. The firewall can also use its cache memory to recognize that it has recently verified the credentials of a specific client and sign the data based upon the credentials provided in the cache memory of the firewall.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 5:
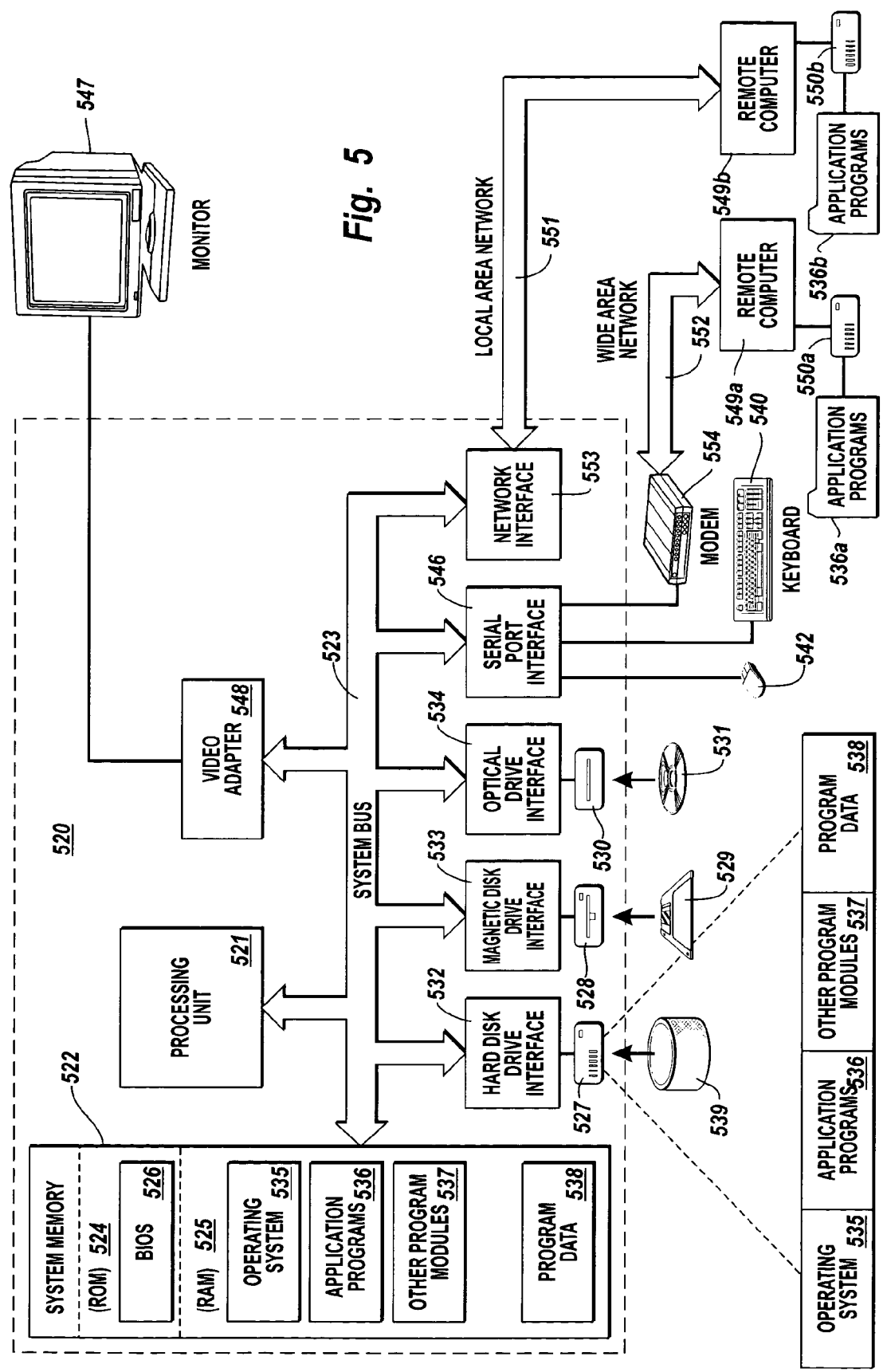
FIG. 5 illustrates an example system that provides a suitable operating environment for the present invention.

FIG. 5 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 5, an exemplary system for implementing the invention includes a general purpose computing device in the form of a conventional computer 520, including a processing unit 521, a system memory 522, and a system bus 523 that couples various system components including the system memory 522 to the processing unit 521. The system bus 523 may be any of several types of bus structures including a memory bus or memory controller, a peripheral bus, and a local bus using any of a variety of bus architectures. The system memory includes read only memory (ROM) 524 and random access memory (RAM) 525. A basic input/output system (BIOS) 526, containing the basic routines that help transfer information between elements within the computer 520, such as during start-up, may be stored in ROM 524.

The computer 520 may also include a magnetic hard disk drive 527 for reading from and writing to a magnetic hard disk 539, a magnetic disk drive 528 for reading from or writing to a removable magnetic disk 529, and an optical disk drive 530 for reading from or writing to removable optical disk 531 such as a CD-ROM or other optical media. The magnetic hard disk drive 527, magnetic disk drive 528, and optical disk drive 530 are connected to the system bus 523 by a hard disk drive interface 532, a magnetic disk drive-interface 533, and an optical drive interface 534, respectively. The drives and their associated computer-readable media provide nonvolatile storage of computer-executable instructions, data structures, program modules and other data for the computer 520. Although the exemplary environment described herein employs a magnetic hard disk 539, a removable magnetic disk 529 and a removable optical disk 531, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 539, magnetic disk 529, optical disk 531, ROM 524 or RAM 525, including an operating system 535, one or more application programs 536, other program modules 537, and program data 538. A client may enter commands and information into the computer 520 through keyboard 540, pointing device 542, or other input devices (not shown), such as a microphone, joy stick, game pad, satellite dish, scanner, or the like. These and other input devices are often connected to the processing unit 521 through a serial port interface 546 coupled to system bus 523. Alternatively, the input devices may be connected by other interfaces, such as a parallel port, a game port or a universal serial bus (USB). A monitor 547 or another display device is also connected to system bus 523 via an interface, such as video adapter 548. In addition to the monitor, personal computers typically include other peripheral output devices (not shown), such as speakers and printers.

The computer 520 may operate in a networked environment using logical connections to one or more remote computers, such as remote computers 549a and 549b. Remote computers 549a and 549b may each be another personal computer, a server, a router, a network PC, a peer device or other common network node, and typically include many or all of the elements described above relative to the computer 520, although only memory storage devices 550a and 550b and their associated application programs 536a and 536b have been illustrated in FIG. 5. The logical connections depicted in FIG. 5 include a local area network (LAN) 551 and a wide area network (WAN) 552 that are presented here by way of example and not limitation. Such networking environments are commonplace in office-wide or enterprise-wide computer networks, intranets and the Internet.

When used in a LAN networking environment, the computer 520 is connected to the local network 551 through a network interface or adapter 553. When used in a WAN networking environment, the computer 520 may include a modem 554, a wireless link, or other means for establishing communications over the wide area network 552, such as the Internet. The modem 554, which may be internal or external, is connected to the system bus 523 via the serial port interface 546. In a networked environment, program modules depicted relative to the computer 520, or portions thereof, may be stored in the remote memory storage device. It will be appreciated that the network connections shown are exemplary and other means of establishing communications over wide area network 552 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a private network comprising a resource and a firewall, which acts as a gateway by controlling client desired access to the private network resource, a method of establishing a connection to the private network resource while balancing authentication processing requirements between a client and the firewall to mutually guard against denial of service attacks, the method comprising steps for:

receiving an assertion from the client that the client has credentials appropriate for accessing the private network resource;

initiating a plurality of authentication transactions between the client and the firewall, the plurality of authentication transactions designed to impose commensurable processing burdens on the client requesting access to the private network resource and the firewall operating as a gateway for the private network to mitigate the potential of a client performing a denial of service attack against the private network, wherein the client initially is unaware that the firewall operates as a gateway for the private network, and wherein successful completion of each authentication transaction incrementally increases a level of trust between the client and the firewall;

for each of the series plurality of authentication transactions between the client and the firewall, using a zero-knowledge proof to challenge the client for credentials, the zero-knowledge proof including:
sending a challenge to the client, the correct answer to the challenge obtainable from the asserted credentials without having to arrange the credentials according to a specified layout and without even having to divulge the asserted credentials such that if the client actually possesses the asserted credentials the client can generate the correct answer;
receiving a response from the client including an answer to the challenge, the answer including at least some measure of proof that the client has credentials and that the client's credentials are correct; and
verifying whether or not the answer included in the response the correct answer to the challenge; and when an acceptable level of probability that the client actually possesses the asserted credentials is reached based on a plurality of correct answers, the firewall granting the client access to the private network resource through the firewall for processing of the asserted credentials.

2. The method of claim 1, wherein the answers are related to at least one of a user's name, client's IP address, password, passport, smart-card or credit card number.

3. The method of claim 1, wherein a challenge is a question, and wherein one or more client credentials received is an answer to the question.

4. The method of claim 1, wherein once the client is granted access to the private network resource the only data passed through the firewall from the client are those packets of data destined to the private network resource.

5. The method of claim 1, wherein the step for granting includes the act of:
establishing an authenticated channel between the firewall and the private network resource, wherein the authenticated channel is established through signing the data from the firewall.

6. The method of claim 5, further comprising the act of:
discarding any unsigned packets of data received by the private network resource.

7. The method of claim 1, wherein the private network resource is one of a host, gateway or server.

8. The method of claim 1, wherein the client is a second firewall.

9. The method of claim 1, further comprising the act of:
establishing a connection with another resource of a separate private network while simultaneously maintaining a secured channel between the firewall and the client.

10. The method of claim 1, further comprising the act of:
establishing a connection with another private network resource while simultaneously maintaining a secured channel between the firewall and the client.

11. The method as recited in claim 1, wherein the step for initiating a plurality of authentication transactions between the client and the firewall comprises an act of initiating a sequence of exchanges of an interactive proof protocol.

12. The method as recited in claim 1, wherein for each of the plurality of authentication transactions sending a challenge to the client comprises sending a challenge that includes:
a portion of a prior response received from the client; and
a plurality of random questions, correct answers to the random questions obtainable by the client if the client actually possesses the asserted credentials.

13. In a private network comprising a resource and a firewall, which acts as a gateway by controlling client desired access to the private network resource, a physical recordable-type computer readable media carrying computer executable instructions that implement a method of establishing a connection to the private network resource while balancing authentication processing requirements between a client and the firewall to mutually guard against denial of service attacks, the method comprising steps for:
receiving an assertion from the client that the client has credentials appropriate for accessing the private network resource;

initiating a plurality of authentication transactions between the client and the firewall, the plurality of authentication transactions designed to impose commensurable processing burdens on the client requesting access to the private network resource and the firewall operating as a gateway for the private network to mitigate the potential of a client performing a denial of service attack against the private network, wherein the client initially is unaware that the firewall operates as a gateway for the private network, and wherein successful completion of each authentication transaction incrementally increases a level of trust between the client and the firewall;

for each of the plurality of authentication transactions between the client and the firewall, using a zero-knowledge proof to challenge the client for credentials, the zero-knowledge proof including:
sending a challenge to the client, the correct answer to the challenge obtainable from the asserted credentials without having to arrange the credentials according to a specified layout and without even having to divulge the asserted credentials such that if the client actually possesses the asserted credentials the client can generate the correct answer;
receiving a response from the client including an answer to the challenge, the answer including at least some measure of proof that the client has credentials and that the client's credentials are correct; and
verifying whether or not the answer included in the response the correct answer to the challenge; and when an acceptable level of probability that the client actually possess the asserted credentials is reached based on a plurality of correct answers, the firewall granting the client access to the private network resource through the firewall for processing of the credentials.

14. The method of claim 13, wherein the credentials are related to at least one of a user's name, client's IP address, password, passport, smart-card or credit card number.

15. The method of claim 13, wherein a challenge is a question, and wherein one or more client credentials received is an answer to the question.

16. The method of claim 13, wherein once the client is granted access to the private network resource the only data passed through the firewall from the client are those packets of data destined to the private network resource.

17. The method of claim 13, wherein the step for granting includes the act of:
establishing an authenticated channel between the firewall and the private network resource, wherein the authenticated channel is established through signing the data from the firewall.

18. The method of claim 17, further comprising the act of:
discarding any unsigned packets of data received by the private network resource.

19. The method of claim 13, wherein the private network resource is one of a host, gateway or server.

20. The method of claim 13, wherein the client is a second firewall.

21. The method of claim 13, further comprising the act of:
establishing a connection with another resource of a separate private network while simultaneously maintaining a secured channel between the firewall and the client.

22. The method of claim 13, further comprising the act of:
establishing a connection with another private network resource while simultaneously maintaining a secured channel between the firewall and the client.

23. The method as recited in claim 13, wherein the step for initiating a plurality of authentication transactions between the client and the firewall comprises an act of initiating a sequence of exchanges of an interactive proof protocol.

24. The method as recited in claim 13, wherein for each of the plurality of authentication transactions sending a challenge to the client comprises sending a challenge that includes:
a portion of a prior response received from the client; and
a plurality of random questions, correct answers to the random questions obtainable by the client if the client actually possesses the asserted credentials.

25. In a private network comprising a server and a firewall, which acts as a gateway by controlling access to the server, a method of providing access to the server through the firewall without a client knowing about the firewall, the method comprising the acts of:
receiving at the firewall, an access request from the client that is directed to the server because the client does not know that the firewall operates as a gateway for the server;
generating one or more authentication credentials at the firewall that demonstrate a level of trust between the server and the firewall;
initiating a plurality of authentication transactions between the client and the firewall, the plurality of authentication transactions designed to impose commensurable processing burdens on the client requesting access to the private network resource and the firewall operating as a gateway for the private network to mitigate the potential of a client performing a denial of service attack against the private network, wherein the client initially is unaware that the firewall operates as a gateway for the private network, and wherein successful completion of each authentication transaction incrementally increases a level of trust between the client and the firewall;
for each of the plurality of authentication transactions between the client and the firewall, the firewall using a zero-knowledge proof to challenge the client for credentials, the zero-knowledge proof including:
the firewall sending a request for the client to authenticate to the firewall, the request including the one or more firewall authentication credentials so that the client knows of the level of trust between the server and the firewall without having to make a separate request and further including a challenge, the correct answer to the challenge obtainable from the asserted credentials without having to arrange the credentials according to a specified layout and without even having to divulge the asserted credentials such that if the client actually possesses the asserted credentials the client can generate the correct answer;
receiving at the firewall, one or more authentication credentials from the client and a response from the client including an answer to the challenge, the answer including at least some measure of proof that the client has credentials and that the client's credentials are correct; and
the firewall verifying the one or more client authentication credentials and whether or not the answer included in the response the correct answer to the challenge; and
thereafter, allowing the client to access the server through the firewall for processing of the authentication credentials.

26. A method as recited in claim 25, further comprising the acts of:
establishing a secure connection between the firewall and the server; and
forwarding data received from the client to the server over the secure connection.

27. A method as recited in claim 25, further comprising an acts of:
receiving at the firewall data from the client;
the firewall signing the received data; and
the firewall forwarding the signed data to the server.

28. A method as recited in claim 25, wherein the server comprises a host or a gateway.

29. A method as recited in claim 25, wherein the client comprises another firewall.

30. A method as recited in claim 25, wherein the client maintains a separate connection with another server, and wherein only data intended for the private network passes through the firewall.

31. A method as recited in claim 30, wherein the other server is part of a separate and distinct virtual private network.

32. A method as recited in claim 25, wherein the act of generating one or more authentication credentials at the firewall that demonstrate a level of trust between the server and the firewall comprises an act of the firewall accessing a private key for the server and using private key to encrypt a portion of data, and further comprising:
an act of including the encrypted portion of data in the request, the encrypted portion of data for use by the client to authenticate the firewall such that the client can use the corresponding public key to decrypt the portion of data and thereby infer that the server trusts the firewall.

33. The method as recited in claim 25, wherein the act of generating one or more authentication credentials at the firewall that demonstrate a level of trust between the server and the firewall comprises an act of generating one or more credentials that permit the firewall to unilaterally authenticate with the client such that the client does not need to have further communications with the firewall to authenticate the firewall.

34. In a private network comprising a server and a firewall, which acts as a gateway by controlling access to the server, a physical recordable-type computer readable media carrying computer executable instructions that implement a method of providing access to the server through the firewall without a client knowing about the firewall, the method comprising the acts of:

receiving at the firewall, an access request from the client that is directed to the server because the client does not know that the firewall operates as a gateway for the server;

generating one or more authentication credentials at the firewall that demonstrate a level of trust between the server and the firewall;

initiating a plurality of authentication transactions between the client and the firewall, the plurality of authentication transactions designed to impose commensurable processing burdens on the client requesting access to the private network resource and the firewall operating as a gateway for the private network to mitigate the potential of a client performing a denial of service attack against the private network, wherein the client initially is unaware that the firewall operates as a gateway for the private network, and wherein successful completion of each authentication transaction incrementally increases a level of trust between the client and the firewall;

for each of the plurality of authentication transactions between the client and the firewall, the firewall using a zero-knowledge proof to challenge the client for credentials, the zero-knowledge proof including:

the firewall sending a request for the client to authenticate to the firewall, the request including the one or more firewall authentication credentials so that the client knows of the level of trust between the server and the firewall without having to make a separate request and further including a challenge, the correct answer to the challenge obtainable from the asserted credentials without having to arrange the credentials according to a specified layout and without even having to divulge the asserted credentials such that if the client actually possesses the asserted credentials the client can generate the correct answer;

receiving at the firewall, one or more authentication credentials from the client and a response from the client including an answer to the challenge, the answer including at least some measure of proof that the client has credentials and that the client's credentials are correct; and the firewall verifying the one or more client authentication credentials and whether or not the answer included in the response the correct answer to the challenge; and thereafter, allowing the client to access the server through the firewall for processing of the authentication credentials.

35. A method as recited in claim 34, wherein the act of generating one or more authentication credentials at the firewall that demonstrate a level of trust between the server and the firewall comprises an act of the firewall accessing a private key for the server and using private key to encrypt a portion of data, and further comprising:

an act of including the encrypted portion of data in the request, the encrypted portion of data for use by the client to authenticate the firewall such that the client can use the corresponding public key to decrypt the portion of data and thereby infer that the server trusts the firewall.

36. The method as recited in claim 34, wherein the act of generating one or more authentication credentials at the firewall that demonstrate a level of trust between the server and the firewall comprises an act of generating one or more credentials that permit the firewall to unilaterally authenticate with the client such that the client does not need to have further communications with the firewall to authenticate the firewall.

* * * * *